United States Patent [19]

Ballet

[11] Patent Number: 4,771,965

[45] Date of Patent: Sep. 20, 1988

[54] BARREL FOR A PRE-STRESSED SPIRAL SPRING AND ITS APPLICATION IN A SAFETY BELT WINDER, IN PARTICULAR FOR A GROUND MOTOR VEHICLE

[75] Inventor: Jean-Noël Ballet, Aillevilliers, France

[73] Assignee: Aciers et Outillage Peugeot, Audinocourt, France

[21] Appl. No.: 65,439

[22] Filed: Jun. 23, 1987

[30] Foreign Application Priority Data

Jun. 24, 1986 [FR] France ............................. 86 09094

[51] Int. Cl.⁴ ..................... B60R 22/34; B65H 75/48
[52] U.S. Cl. .................................. 242/107; 242/107.5; 185/45
[58] Field of Search ............... 242/107, 107.5, 107.3, 242/107.6, 107.7, 107.4 B; 185/39, 37, 45; 29/446

[56] References Cited

U.S. PATENT DOCUMENTS

| | | | |
|---|---|---|---|
| 2,033,049 | 3/1936 | Pankonin | 242/107.5 X |
| 2,442,571 | 6/1948 | Ruddock | 242/107.3 X |
| 3,033,488 | 5/1962 | Weber | 242/107.5 |
| 3,246,363 | 4/1966 | Rogas et al. | 242/107.5 X |
| 3,282,529 | 11/1966 | Greenfield | 242/107.11 |
| 3,312,420 | 4/1967 | Boedigheimer | 242/107.11 |
| 4,159,809 | 7/1979 | Rawson | 242/107 |
| 4,417,703 | 11/1983 | Weinhold | 242/107.12 |

FOREIGN PATENT DOCUMENTS 160892 4/1985 European Pat. Off. .
2540671 3/1977 Fed. Rep. of Germany .

Primary Examiner—John M. Jillions
Attorney, Agent, or Firm—Sughrue, Mion, Zinn, Macpeak and Seas

[57] ABSTRACT

The barrel comprises a pre-stressed spiral spring which arms the barrel and further comprises a housing (100), a rotatable hub (200) and the spring (300) which is wound around the hub and anchored to the latter and to the housing. The barrel includes between the hub and the housing an anti-return device (400) which allows a relative rotation between the hub and the housing in only a single direction but is so arranged as to be movable between a first position in which it allows said relative rotation in only the single direction and a second position in which it allows rotation in both directions. The device is accessible from outside the housing for the purpose of shifting the device from one to the other of its positions. The barrel is particularly useful in ground motor vehicle safety belt winders.

15 Claims, 2 Drawing Sheets

BARREL FOR A PRE-STRESSED SPIRAL SPRING AND ITS APPLICATION IN A SAFETY BELT WINDER, IN PARTICULAR FOR A GROUND MOTOR VEHICLE

The invention relates to a barrel having a prestressed spiral spring and is used in particular for a safety belt having a winder, such as that existing on ground motor vehicles.

For the safety of their passengers, automobiles are equipped with safety belts which, in order to facilitate the utilization while improving the comfort and the effectiveness, are provided with a winder. As is known, such a winder has a double function: when the belt is not used, the winder maintains the latter taut against or close to a lateral wall of the vehicle compartment, so that it does not lie in disorder on the seat or the floor and that it is easy to take hold of for its use; when the belt is used, the winder maintains the latter applied against the waist and/or chest of the passenger, so that it does not hinder the slow and progressive movements of the passenger while being capable of effectively retaining the passenger on his seat, without slack, in the case of a rapid and sudden displacement forwardly of the vehicle.

In such a winder, that which maintains the belt permanently taut is a barrel having a pre-stressed spiral spring.

A barrel of this type is essentially composed of a housing, a hub mounted in the housing in such manner as to be rotatable about its axis and a spring placed in the housing and wound round the hub in such manner that one of its ends is anchored to the housing and the other to the hub. To develop the return torque, the spiral spring is wound to a greater or lesser extent on the hub by rotating the latter relative to the housing so as to stress the spring, and the housing and the hub are temporarily immobilized relative to each other before they are coupled to the drum of the winder on which the strap of the safety belt is wound and unwound.

To handle such an "armed" barrel, i.e. a barrel containing a pre-stressed spring, is delicate. It is first of all necessary to pre-stress the spring in such manner that in the initial, static, state, it exerts the chosen torque; then, depending on the type of operation adopted related to the direction of rotation for unwinding the strap which may produce an increase or a decrease in the return torque, depending on whether the spring is wound or unwound, the number of possible rotations of the hub must be regulated to permit the maximum extension of the strap before the spring be completely tightened in the centripetal direction with its coils against one another, on the hub, or be completely untightened or "exploded" in the centrifugal direction, with its coils against one another and against the housing; lastly, the pre-stressed spring must be retained in its initial state without risk of its spontaneously becoming released until the moment when, with the coupling being made if need be in opposition to the initial torque, it will be released so that it can develop its action.

Thus it can be seen that these arming operations on a barrel and the use of an armed barrel where an initial torque is exerted which must be overcome in the course of the preliminary stages are not easily carried out.

In an attempt to solve these difficulties, the French certificate of addition No. 2 482 863 disloses a solution. According to this document, in order to temporarily immobilize the hub and the housing relative to one another of a barrel having an armed spiral spring, a removable longitudinal or transverse key is used which is engaged or disengaged from complementary cavities provided on the hub and on the housing, which have been previously brought into corresponding confronting relation to one another. This solution presents many drawbacks. The putting into correspondence of the cavities of the hub and the housing for inserting the key is an operation which requires time and precision, and does not exclude the risk of the hub escaping and rotating in the opposite direction under the action of the torque of the spring which has just been pre-stressed and which "unwinds". The insertion of the key ensures the locking against rotation in both directions; once they have been immobilized with respect to each other, it is no longer possible to effect a progressive regulation of the initial torque, and/or of the number of rotations by effecting a slight relative rotation between the hub and the housing. The release of the hub relative to the housing for neutralizing, eliminating the locking at the moment of coupling requires removal of the key, i.e. an additional and non-automatic operation which is liable to occur prematurely with the consequence that the spring "unwinds" or "explodes" spontaneously. Apart from these drawbacks, it will be observed that the structure of the embodiments taught by this document is such, when it has been mounted in its housing, that the hub has a bearing only at one of its ends, i.e. the hub guided at a single end can become inclined relative to its theoretical axis of rotation and therefore there is a risk of ts wedging and becoming jammed, which risk can only increase with use, since a single bearing becomes rapidly worn.

The invention provides a barrel for a pre-stressed spiral spring comprising, among other elements, a housing, a hub mounted within the housing in such manner as to be rotatable about its axis and a spiral spring placed in the housing and wound on said hub in such manner that one of its ends is anchored to the housing and the other to the hub. This barrel further comprises between the housing and the hub an anti-return device which allows the relative rotation between the housing and the hub in only a single direction, and said anti-return device is so arranged as to be movable between a first active position where it is operative and permits only this relative rotation in the allowed direction so as to be able to stress the spring and retain it in this state, and a second neutralized position in which it is put out of action and permits said relative rotation in both directions and said device is accessible from outside the housing so as to enable it to be moved between either of its two positions.

The invention also provides the application of such an armed barrel in a safety belt winder, in particular for ground motor vehicles.

Further features and advantages of the invention will be apparent from the following description with reference to the drawing, which is given solely by way of example, and in which.

Figure 1:
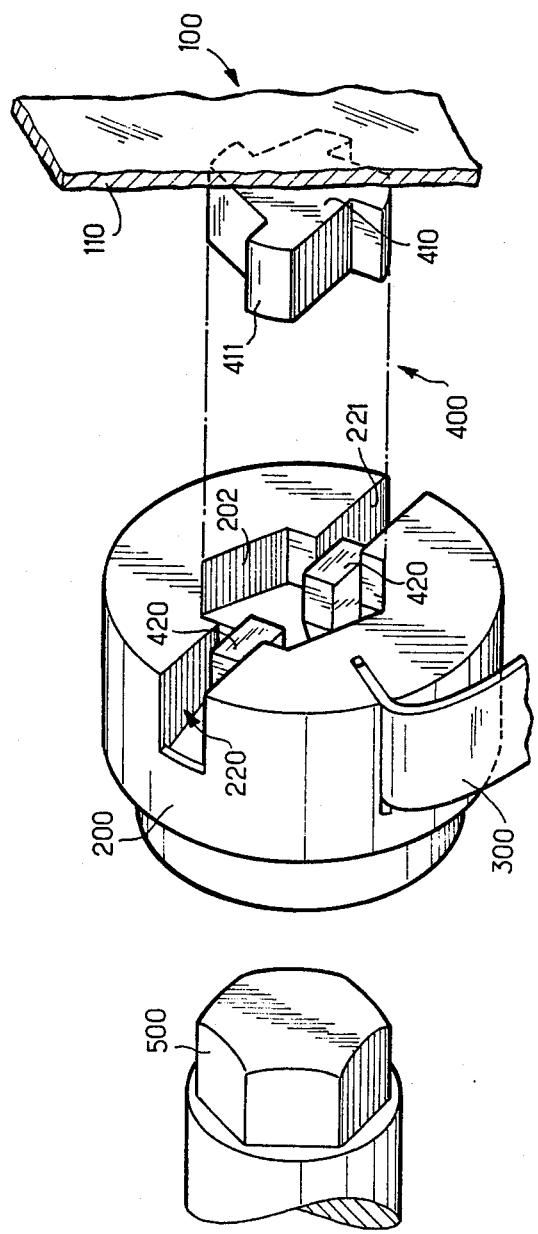
FIG. 1 is a diagrammatic exploded partial perspective view of one embodiment of a barrel according to the invention.

As "armed" barrels having a pre-stressed spiral spring are known in the art, there will be described and illustrated only that which directly and/or indirectly concerns the invention.

As can be seen in the drawing, the illustrated embodiment of an armed barrel having a pre-stressed spiral spring according to the invention comprises a housing 100, a hub 200, a spring 300 and an anti-return device 400.

The housing 100 comprises essentially a body 110 with a bottom 111 carrying a journal 112 and a cover 120 provided with an orifice 121. This housing is made for example by molding a suitable plastics material and the body and the cover are retained on each other for example by clipping, bonding with solvents or ultrasounds, adhesion, screwing, or any other suitable conventional technique, bearing in mind that the assembly is or is not to be capable of being taken apart. This housing may be cylindrical, parallel-sided, prismatic or of some other shape and carries, if need be, means for mounting it and/or fixing it on a structure such as the body of a vehicle.

Disposed in this housing is a hub 200, which preferably has a cylindrical lateral periphery and is mounted in such manner as to be rotable about its axis. The centering of the hub on its axis is ensured by a shoulder 201 and a bore 202 located at its opposite ends which cooperate with the orifice 121 of the oover and the journal 112 of the bottom of the body, respectively. Provided in the lateral surface of the hub in at least a part of a generatrix is a slot 203, for example a radial slot, which serves to anchor one of the ends of the spring, as will be explained hereinafter. As can be seen, the bore 202 is extended by an axial cavity 210, at least one end of which opposed to the bore is open to the exterior. This cavity preferably has a polygonal cross-sectional shape for the reason indicated hereinafter. Opening onto this cavity is at least one recess 220 which is provided in the thickness of the hub and has two walls 221 in facing relation to each other and parallel to the meridian plane containing the axis of the recess, as illustrated. In the presently-described embodiment, two diametrically opposed recesses are employed, but, as will be understood hereinafter, one is sufficient and the number of two is not intended to be limitative. The function of these cavities will be clear hereinafter. This hub is for example produced by moulding a plastics material which has a certain elasticity under the particular given conditions of operation.

A spiral spring 300 is wound around the hub 200. One of the ends (not shown) of the spring is anchored to the housing 100, for example to the body 110 in any suitable manner, as is known, and the other end, 302, is anchored to the hub 200. To achieve this, the end 302 is, for example, bent so as to be engaged in the slot 203, but any other technique may be used, for example, screwing, rivetting and the like. This spring is made from a band of, for example, steel, bronze alloy, or plastics material.

Figure 2:
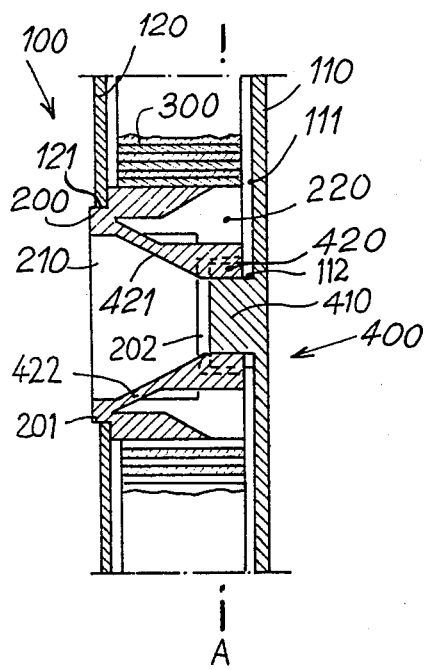
FIG. 2 is a partial axial sectional view in a meridian plane of the embodiment of FIG. 1, where the anti-return device is illustrated in its first active position.
Figure 3:
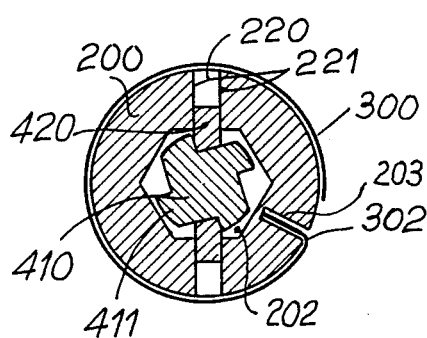
FIG. 3 is a sectional view taken on line A of FIG. 2.
Figure 4:
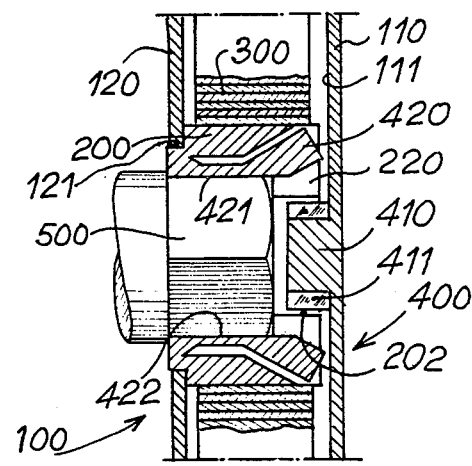
FIG. 4 is a view similar to FIG. 2, in which the anti-return device is illustrated in its second neutralized position.

The anti-return device 400 comprises a ratchet 410 which has inclined teeth 411, for example four in number, and at least one pawl 420, in the presently-described embodiment two pawls. In this embodiment, the ratchet is integral with the housing, and in particular the body 110, and the pawl or pawls with the hub 200. As can be seen in FIGS. 2 and 4, in particular, the pawl 420 comprises a cam 421, the function of which will be indicated hereinafter, and an arm 422 which connects it to the hub in the vicinity of the shoulder. As can be seen in FIG. 3, the pawl has an approximately rectangular cross-sectional shape and disposed in the recess 220 where it is relatively freely movable by bearing, if need be, against either one of the walls 221. The pawl is movable between a first inwardly projecting position in the centripetal or radially inward direction, relative to the hub where it cooperates with the teeth of the ratchet and only allows a relative rotation between the hub and the housing in only a single direction (as shown in FIGS. 2 and 3), and a second position in which its at least partly withdrawn in the centrifugal or radially outward direction, where it does not cooperate with the teeth of the ratchet and allows a relative rotation between the hub and the housing in both directions (FIG. 4).

The pawl is normally elastically biased toward its projecting first position by a spring. In the presently-described embodiment, it is the arm 422 which performs the function of a spring. The anti-return device therefore normally only permits a rotation in a single direction.

In order to put the anti-return device out of action, i.e. utilize the pawl, it must be shifted from its first position to its second position by exerting a force in opposition to the elastic biasing to which it is normally subjected. For this purpose, there is introduced from the exterior of the housing a male element in the cavity 210 so as to urge back in the centrifugal direction the pawl 420 which shifts the pawl 420 away from the ratchet 410 by bending the arm 422. This action of introduction for urging back the pawl is facilitated by the cam 421.

This operation for neutralizing the anti-return device 400 is easily carried out with a pin 500 which has a cross-sectional shape which is complementary to that of the cavity 210, as illustrated in FIG. 4. Such a pin may, for example, be an Allen key or the end of the shaft or of the drum of a safety belt winder in which the belt strap is wound.

The armed barrel according to the invention operates in the following manner:

It will be assumed that this barrel is assembled, the ends of the spring anchored to the hub and to the body, the housing is closed by the cover and the spring is not in the stressed state.

There is partly introduced into the cavity 210 a pin 500, for example a hollow six-sided key associated if need be with a dynamometric spanner, so as to bring about a relative rotation between the hub and the housing without neutralizing the anti-return device whose pawl at this moment allows rotation only in a single direction. By causing a relative rotation between the hub and the housing, the spring is put under stress so that it develops the chosen torque and/or produces the required number of rotations. When this operation has terminated, the withdrawal of the pin from the cavity allows the antireturn device to operate, and the barrel remains "armed" without need to be concerned with any immobilization of the hub relative to the housing by means of a removable auxiliary element, since this operation is automatic.

To put the spring under stress, it is also possible to engage completely to the inner end of the cavity 210 a special pin which has recesses of special shape in vertical alignment with the pawls so as to avoid touching them and urging them back when it is completely inserted. A fool-proof device may be provided to facilitate the automatic positioning of such a pin with the correct orientation.

To use the armed barrel, it is placed on the equipment for which it is intended, for example the winder of a safety belt of a compartment of a vehicle, and it is fixed thereto. In the course of the operation, the pin 500 is engaged fully in the cavity 210 with which it is coupled, which has for effect to automatically shift the pawl to its second position where it is neutralized and allows a rotation in both directions.

The number and shape of the teeth of the ratchet, and of the pawls, are a function of the forces to be transmitted and to withstand and of the choice of the materials from which they are made.

In the illustrated embodiment, the hub may be moulded with the pawls in the same way as the bottom of the housing with the ratchet.

The shape of the cam 421 depends on the geometry of the end portion of the pin 500 which cooperates therewith, the relative coefficients of friction between the cam and pin, and the force to be overcome developed by the elastic arm 422.

It will also be observed that, in this embodiment, the geometries of the ratchet 410 and of the bore 202 are so chosen that the ratchet also serves as a journal, so that the hub has a bearing at both of its ends. However, nothing opposes that these two components be operationally and/or physically distinct.

In the embodiment just described, the pawls are movable in a longitudinal plane. It is clear that, by modifying their configuration, they may be shifted in a transverse plane. Likewise, the direction of displacement for passing from the first to the second position may be reversed.

It will be understood that the armed barrel according to the invention has many applications other than that indicated merely by way of example in the foregoing description.

What is claimed is:

1. A barrel for a pre-stressed spiral spring comprising at least a housing and, disposed in said housing, a hub mounted to be rotatable about an axis of the hub and a spiral spring placed in the housing and wound around the hub and having on end anchored to the housing and an opposite end anchored to the hub, the barrel further comprising, disposed inside said housing and between the housing and the hub, an anti-return device which is normally operative to allow a relative rotation between the housing and the hub in only a single direction, this anti-return device being movable between a first active position in which the device is operative and allows said relative rotation only in said single direction so as to permit a putting of the spring under stress and a retention of the spring in said stressed state, and a second neutral position in which the device is inoperative and permits said relative rotation in both directions, said device being accessible from outside the housing for the purpose of shifting it from one to the other of its two positions.

2. A barrel according to claim 1, wherein the anti-return device comprises a ratchet and at least one pawl, one of the the ratchet and the pawl being joined to the housing, and the other being joined to the hub.

3. A barrel according to claim 2, wherein the ratchet is joined to the housing and the pawl is joined to the hub.

4. A barrel according to claim 3, wherein the hub has a cavity and the pawl is placed at least partly in said cavity.

5. A barrel according to claim 3, wherein the hub has a cavity and a plurality of pawls are placed at least partly in said cavity.

6. A barrel according to claim 2, wherein the hub is generally cylindrical and has at least one radial recess extending longitudinally of the hub and having two confronting walls parallel to a meridian plane of the recess, and the pawl is at least partly disposed therein so as to be capable of bearing against said walls and moving between said first position in which the pawl is at least partly projecting and cooperates with the ratchet, and said second position in which the pawl is at least partly withdrawn and in which the pawl does not cooperate with the ratchet.

7. A barrel according to claim 1, further comprising means for elastically biasing the device from the first position to the second position thereof.

8. A barrel according to claim 4, wherein the pawl is provided with a cam which is accessible from outside the housing.

9. A barrel according to claim 8, wherein said hub is generally cylindrical, said cam is placed on the pawl in confronting relation to the axis of the hub, and said cam projects at least party into the cavity of the hub when the pawl occupies its first position.

10. A barrel according to claim 1, wherein the housing comprises a body having a bottom and a cover, the ratchet is integral with an inner surface of the bottom of the body, the cover is provided with an orifice in alignment with the ratchet, and the hub is disposed in the housing in such manner as to be journalled therein by a combination of the ratchet and the orifice so that it is possible to shift, through said orifice, the antireturn device from one to the other of the two positions thereof.

11. A barrel according to claim 4, wherein the cavity of the hub has a polygonal cross-sectional shape.

12. A barrel according to claim 2, wherein the hub is made from a relatively elastic plastics material, and the hub and the pawl are moulded in one piece.

13. A barrel according to claim 10, wherein the body and the cover are assembled by a clipping together.

14. A barrel according to claim 6, wherein said pawl is bendable and is normally biased radially inwardly to project into said cavity and into engagement with said ratchet in said first position, and wherein said cavity is open to the outside of said housing for receiving an axially inserted tool for bending said pawl radially outwardly to said second position.

15. A structure comprising in combination: a vehicle safety belt winder and a barrel for a pre-stressed spiral spring comprising at least a housing and, disposed in said housing, a hub mounted to be rotatable about an axis of the hub and a spiral placed in the housing and wound around the hub and having one end anchored to the housing and an opposite end anchored to the hub, the barrel further comprising inside the housing between the housing and the hub an anti-return device which allows a relative rotation between the housing and the hub only in a single direction, this anti-return device being movable between a first active position in which the device is operative and allows said relative rotation only in said single direction so as to permit a putting of the spring under stress and a retention of the spring in said stressed state, and a second neutralized position in which the device is inactive and permits said relative rotation in both directions, said device being accessible from outside the housing for the purpose of shifting it from one to the other of its two positions.

* * * * *